(12) United States Patent
Mizoguchi et al.

(10) Patent No.: US 12,545,256 B2
(45) Date of Patent: Feb. 10, 2026

(54) VEHICLE TRAVELING CONTROL APPARATUS

(71) Applicant: SUBARU CORPORATION, Tokyo (JP)

(72) Inventors: Masato Mizoguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 99 days.

(21) Appl. No.: 18/597,418

(22) Filed: Mar. 6, 2024

(65) Prior Publication Data

US 2024/0308520 A1    Sep. 19, 2024

(30) Foreign Application Priority Data

Mar. 16, 2023    (JP) ................................. 2023-041741

(51) Int. Cl.
| | |
|---|---|
| *B60W 30/00* | (2006.01) |
| *B60W 30/18* | (2012.01) |
| *G06T 7/00* | (2017.01) |
| *G06T 7/70* | (2017.01) |
| *G06V 10/25* | (2022.01) |
| *G06V 20/00* | (2022.01) |
| *G06V 20/58* | (2022.01) |

(52) U.S. Cl.
CPC ......... *B60W 30/18154* (2013.01); *G06T 7/70* (2017.01); *G06V 10/25* (2022.01); *G06V 20/584* (2022.01); *B60W 2420/403* (2013.01); *B60W 2554/20* (2020.02); *B60W 2554/802* (2020.02); *B60W 2555/60* (2020.02); *B60W 2720/10* (2013.01); *G06T 2207/10024* (2013.01); *G06T 2207/30252* (2013.01)

(58) Field of Classification Search
CPC ....... B60W 30/18154; B60W 2554/20; B60W 2555/60; B60W 2554/802; B60W 2420/403; B60W 2720/10; G06T 7/70; G06T 2207/10024; G06T 2207/30252; G06V 10/25; G06V 20/584
USPC ........................................................ 701/93
See application file for complete search history.

(56) References Cited

FOREIGN PATENT DOCUMENTS

| CN | 108162760 B | * | 7/2022 | ............. G08G 1/165 |
|---|---|---|---|---|
| JP | 2019-053619 A | | 4/2019 | |
| JP | 2021-002275 A | | 1/2021 | |

* cited by examiner

*Primary Examiner* — Tiffany P Young
(74) *Attorney, Agent, or Firm* — Rimon P.C.

(57) ABSTRACT

A vehicle traveling control apparatus includes an in-vehicle camera, a processor, and a memory. The in-vehicle camera performs imaging to obtain a captured image of a traffic signal outside the vehicle. The processor executes a traffic signal stop control. The processor sets a detection region in the captured image, and extracts information on a reference object in the captured image and records the information in the memory. The detection region is adapted to a detection of a green lighting state of the traffic signal in the captured image. The captured image is obtained by the in-vehicle camera in the vehicle when the vehicle is stopped. The processor performs an adjustment of the detection region based on a difference between the reference object in the captured image after the setting of the detection range and the reference object in the captured image recorded in the memory.

8 Claims, 10 Drawing Sheets

VEHICLE TRAVELING CONTROL APPARATUS

CROSS-REFERENCE TO RELATED APPLICATIONS

The present application claims priority from Japanese Patent Application No. 2023-041741 filed on Mar. 16, 2023, the entire contents of which are hereby incorporated by reference.

BACKGROUND

The disclosure relates to a vehicle traveling control apparatus.

Traffic signals are provided on roads on which vehicles such as automobiles travel. For example, when a lighting color of the traffic signal is red, the vehicle is to stop before the traffic signal. When the lighting color of the traffic signal turns green, the stopped vehicle restarts and begins traveling again.

It may be desirable to make it possible for a vehicle traveling control apparatus to execute such a control of stopping a vehicle for a traffic signal. For example, Japanese Unexamined Patent Application Publication (JP-A) Nos. 2019-053619 and 2021-002275 each disclose a technique of setting a region to determine each of lighting colors of red, yellow, and green or arrow-shaped lighting of the traffic signal.

Setting the region as described above may allow the vehicle traveling control apparatus to detect a green lighting state in a shorter time by executing smaller-load processing on a portion of a captured image rather than executing processing on the entire captured image.

SUMMARY

An aspect of the disclosure provides a vehicle traveling control apparatus that includes an in-vehicle camera, a processor, and a memory. The in-vehicle camera is provided in a vehicle and configured to perform imaging to obtain a captured image of a traffic signal outside the vehicle. The processor is configured to execute a traffic signal stop control of analyzing the captured image obtained by the in-vehicle camera and stopping the vehicle before the traffic signal in a red lighting state. The memory is configured to be used by the processor. The processor is configured to set a detection region in the captured image, and extract information on a reference object in the captured image and record the information in the memory. The detection region is adapted to a detection of a green lighting state of the traffic signal in the captured image. The captured image is obtained by the in-vehicle camera in the vehicle when the vehicle is stopped. The processor is configured, to determine the green lighting state of the traffic signal in the detection region based on the captured image obtained by the in-vehicle camera after setting of a detection range and to restart the vehicle, perform an adjustment of the detection region based on a difference between the reference object in the captured image after the setting of the detection range and the reference object in the captured image obtained when the vehicle is stopped and recorded in the memory.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
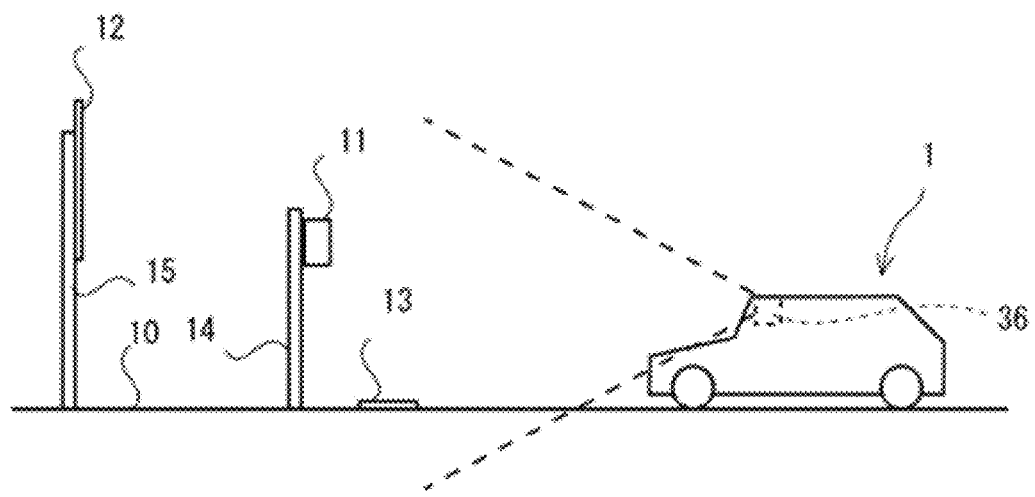
FIG. 1 is an explanatory diagram illustrating an example of a traveling environment of a vehicle according to one example embodiment of the disclosure.

A traveling control of setting a region and stopping a vehicle for a traffic signal as disclosed in JP-A Nos. 2019-053619 and 2021-002275 may still have a possibility of erroneously detecting a green lighting state of the traffic signal.

For example, the foregoing traveling control of stopping the vehicle for the traffic signal may set a region to be used in a later process, based on the assumption that the vehicle provided with an in-vehicle camera does not move during execution of the control of stopping the vehicle. However, for example, when a following vehicle comes into slight contact with the vehicle during the execution of the control of stopping the vehicle for the traffic signal, the vehicle can move forward in spite of the execution of the control of stopping the vehicle. Moreover, when a performance of a braking apparatus of the vehicle is deteriorated, a possibility may not be zero that the vehicle slightly moves in a traveling direction even during the execution of the control of stopping the vehicle.

When the vehicle moves in such a manner during the execution of the control of stopping the vehicle for the traffic signal, a vehicle traveling control apparatus may not be able to determine the green lighting state of the traffic signal in the set region.

Moreover, for example, if the detection region after the movement of the vehicle includes an object such as a green road sign other than the traffic signal, the vehicle traveling control apparatus can erroneously determine that the traffic signal has changed to the green lighting state. For example, when the region is set greater than an actual imaging size of the traffic signal, taking into consideration a factor such as a relative movement of the traffic signal, the possibility can increase that the green lighting state of the traffic signal is erroneously detected based on an object such as the green road sign included in a background around the traffic signal also when the traffic signal has not moved relatively.

It is desirable to provide a vehicle traveling control apparatus that makes it possible to improve a traffic signal stop control using a detection region adapted to a detection of a green lighting state of a traffic signal.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating an example of a traveling environment of a vehicle 1 according to a first example embodiment of the disclosure.

FIG. 1 illustrates a passenger car as an example of the vehicle 1. However, the vehicle 1 is not limited to a passenger car, and may be any vehicle, for example, a large vehicle such as a truck or a bus, a small personal mobility, or a motorcycle.

The vehicle 1 illustrated in FIG. 1 may be traveling on a road 10. The road 10 may be provided with objects including, without limitation, a traffic signal 11, a road sign 12, and a signboard. The road sign 12 may be provided to give guidance for a destination. Typically, the object such as the traffic signal 11, the road sign 12, or the signboard may be attached to a post 14 or 15 in order to allow the object to be easily visually recognized by an occupant who is present in the vehicle 1 traveling on the road 10. The posts 14 and 15 may stand along the road 10. The traffic signal 11 may be an apparatus that gives an instruction for the vehicle 1 to stop traveling, for example, at an intersection. When the traffic signal 11 is in a red lighting state, the vehicle 1 may be to stop before a stop line 13 provided on the road 10. When the traffic signal 11 is in a yellow lighting state, the vehicle 1 may be to decelerate to stop before the stop line 13. When the traffic signal 11 is in a green lighting state, the vehicle 1 may be allowed to travel beyond the stop line 13, for example, toward the intersection. When a driver, who is an occupant in the vehicle 1, causes the vehicle 1 to travel, the driver may be to operate or manage traveling of the vehicle 1 while visually recognizing the objects including, without limitation, the traffic signal 11, the road sign 12, and the signboard.

Figure 2:
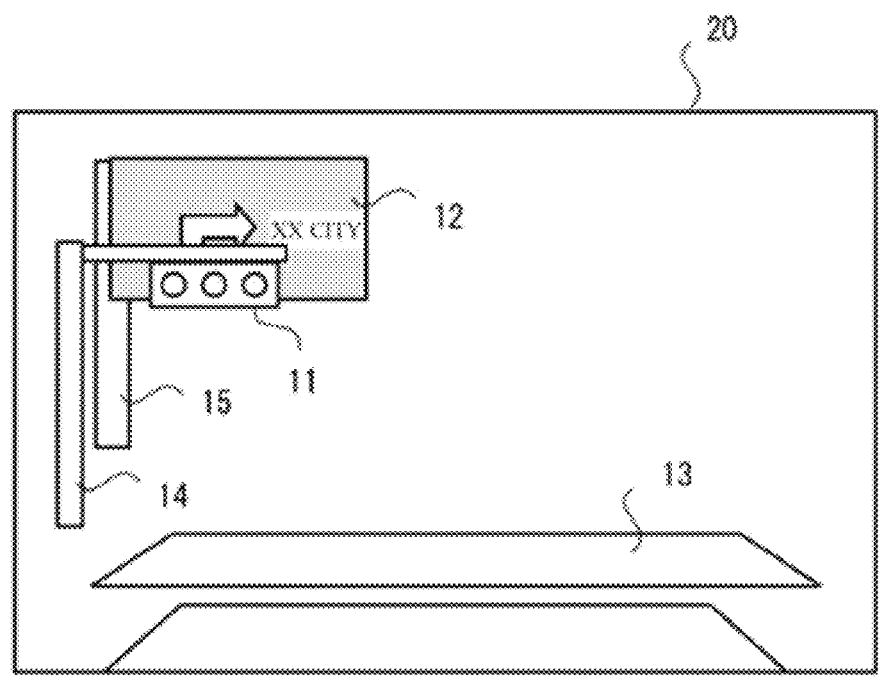
FIG. 2 is an explanatory diagram illustrating a captured image obtained from the vehicle in the traveling environment illustrated in FIG. 1.

FIG. 2 is an explanatory diagram illustrating a captured image 20 obtained from the vehicle 1 in the traveling environment illustrated in FIG. 1.

The vehicle 1 illustrated in FIG. 1 may be provided with an in-vehicle camera 36. For example, in some example embodiments, the in-vehicle camera 36 may be provided in a vehicle compartment, facing a front direction as illustrated in FIG. 1. The front direction may be a traveling direction of the vehicle 1. The in-vehicle camera 36 provided in such a manner may be configured to capture an image in the front direction viewed from the vehicle compartment of the vehicle 1, as illustrated in FIG. 2. The captured image 20 illustrated in FIG. 2 may include, for example, a hood, the stop line 13, the traffic signal 11, and the signboard. The hood may be a front part of the vehicle 1. The stop line 13, the traffic signal 11, and the signboard may be present outside the vehicle 1 illustrated in FIG. 1.

Note that the in-vehicle camera 36 is not limited to that described above. In some example embodiments, the in-vehicle camera 36 may be a camera that performs imaging of an entire 360-degree region surrounding the vehicle 1. For example, the in-vehicle camera 36 that performs the imaging of the entire 360-degree region surrounding the vehicle 1 may perform imaging of both an inside and an outside of the vehicle 1. In some example embodiments, a plurality of in-vehicle cameras 36 may be provided in the vehicle 1, having respective viewing angles shifted from each other. For example, the in-vehicle cameras 36 may be disposed in a predetermined positional relationship to calculate a distance to an object that is captured by two or more of the in-vehicle cameras 36.

Obtaining such a captured image 20 of the outside of the vehicle 1 may allow the traveling control apparatus 30 for the vehicle 1 to execute a control of assisting a driving operation performed by the driver, or to control traveling of the vehicle 1 based on automated driving independent of the driving operation performed by the driver. The traveling control apparatus 30 for the vehicle 1 may be configured to, for example, when analyzing the captured image 20 obtained by the in-vehicle camera 36 and determining that the traffic signal 11 in the captured image 20 is in the red lighting state, control the traveling of the vehicle 1 to stop the vehicle 1 at the stop line 13 before the traffic signal 11. Such a traveling control apparatus 30 for the vehicle 1 may be configured to execute a traffic signal stop control, i.e., a control of stopping the vehicle 1 for the traffic signal 11. In one embodiment, the traveling control apparatus may serve as a "vehicle traveling control apparatus".

Figure 3:
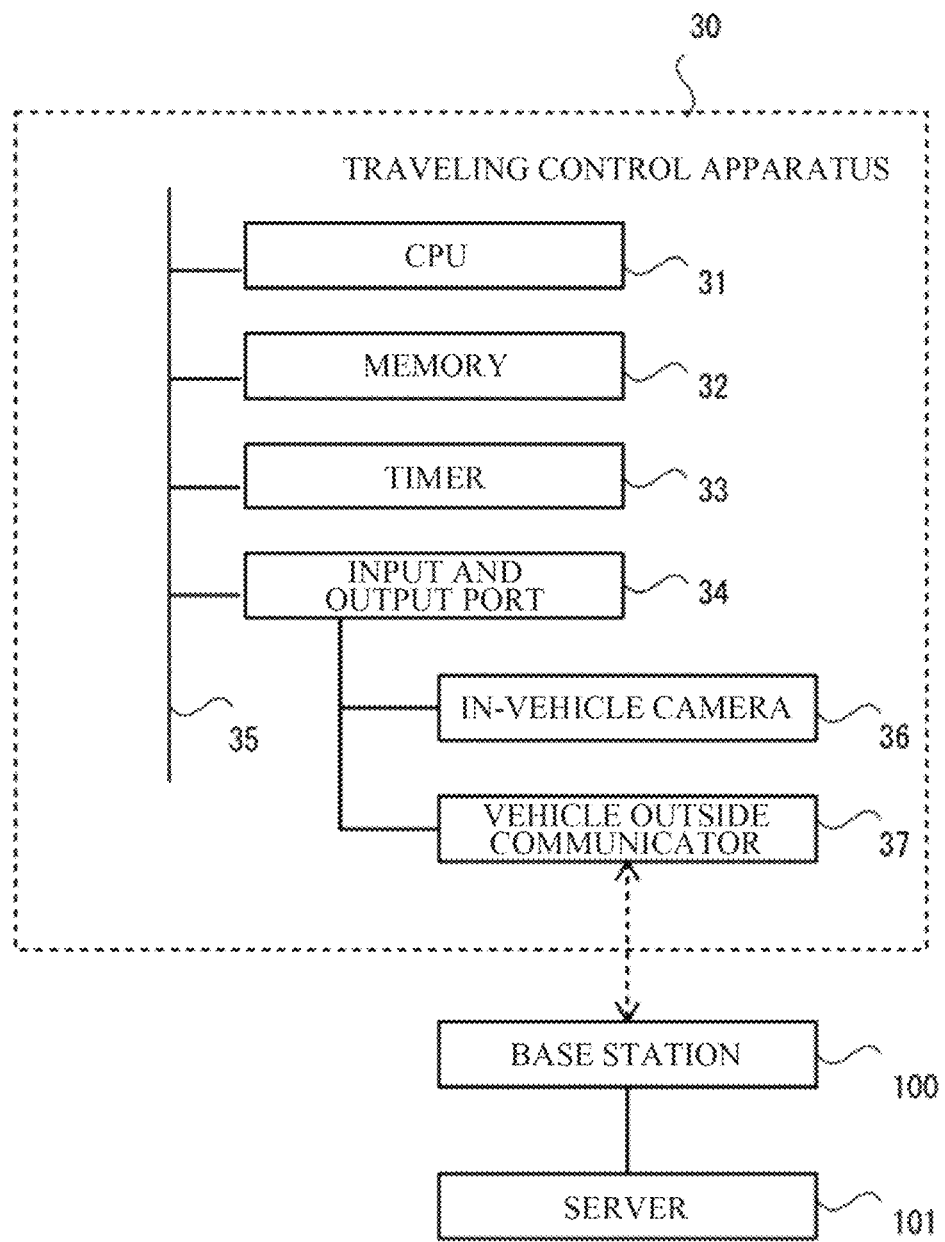
FIG. 3 is a diagram illustrating a basic configuration of a traveling control apparatus for the vehicle illustrated in FIG. 1.

FIG. 3 is a diagram illustrating a basic configuration of the traveling control apparatus 30 for the vehicle 1 illustrated in FIG. 1.

The traveling control apparatus 30 illustrated in FIG. 3 may include a central processing unit (CPU) 31, a memory 32, a timer 33, an input and output port 34, and a control bus 35. The CPU 31, the memory 32, the timer 33, and the input and output port 34 may be coupled to the control bus 35. Coupled to the input and output port 34 may be, for example, the in-vehicle camera 36 described above and a vehicle outside communicator 37.

The vehicle outside communicator 37 may establish a wireless communication path to a base station 100 provided in relation to, for example, the road 10. In some example embodiments, the base station 100 may be a base station of a carrier, or may be a base station for advanced driver assistance systems (ADAS). The vehicle outside communicator 37 may transmit and receive, via the base station 100, information to and from a server 101 coupled to the base station 100. Note that in some example embodiments, a plurality of servers 101 may be provided in a distributed manner in correspondence with a plurality of base stations 100. In some example embodiments, the server 101 may be provided in the base station 100 for 5G communication. The server 101 provided in the base station 100 for 5G communication may execute a high-speed and large-capacity communication with the vehicle outside communicator 37.

Coupled to the input and output port 34 may be various apparatuses to be used in the traveling control of the vehicle 1. For example, coupled to the input and output port 34 may be the in-vehicle camera 36 that is illustrated in FIG. 3 and performs imaging of the outside of the vehicle 1, and the vehicle outside communicator 37 illustrated in FIG. 3. In some example embodiments, in addition thereto, an acceleration sensor, a speed sensor, a driver operation detection sensor, a light detection and ranging (LiDAR), an infrared-ray sensor, a vehicle inside camera, and an in-vehicle wireless communicator may also be coupled to the input and output port 34. Note that the vehicle 1 may be provided with a vehicle network based on a standard such as a controller area network (CAN) or a local interconnect network (LIN). In some example embodiments, the various apparatuses to be used in the traveling control of the vehicle 1 may be directly coupled to the vehicle network. In this case, the traveling control apparatus 30 illustrated in FIG. 3 may include an in-vehicle communication device that controls input and output of information via the vehicle network, and may input and output information to and from another control apparatus via the in-vehicle communication device. For example, the in-vehicle communication device may be coupled to the input and output port 34, or may be coupled to the control bus 35.

The timer 33 may measure a time period and a time.

The memory 32 may include, for example, a non-volatile semiconductor memory, a hard disk drive (HDD), or a random-access memory (RAM). The memory 32 may contain, for example, a program to be executed by the CPU 31 and data. The data recorded in the memory 32 may include, for example, information regarding the captured image 20 detected in the vehicle 1 and high-precision map data.

The CPU 31 may read the program recorded in the memory 32 and execute the program. This may implement a processor that controls the traveling of the vehicle 1.

In one embodiment, the CPU 31 may serve as a "processor". The CPU 31 may determine a traveling state of the vehicle 1 based on various kinds of information recorded in the memory 32, generate a control value for a control based on the traveling state, and output the control value to any of a drive control apparatus, a steering control apparatus, and a braking control apparatus that are not illustrated. The drive control apparatus may control an operation of a power source provided in the vehicle 1 based on the control value. Non-limiting examples of the power source may include an engine and a motor. The steering control apparatus may control an operation of a steering member provided in the vehicle 1, based on the control value. The braking control apparatus may control an operation of a braking member provided in the vehicle 1, based on the control value. In some example embodiments, the braking member may be implemented, for example, by a regeneration operation of the motor.

Next, a traffic signal stop control will be described.

Figure 4:
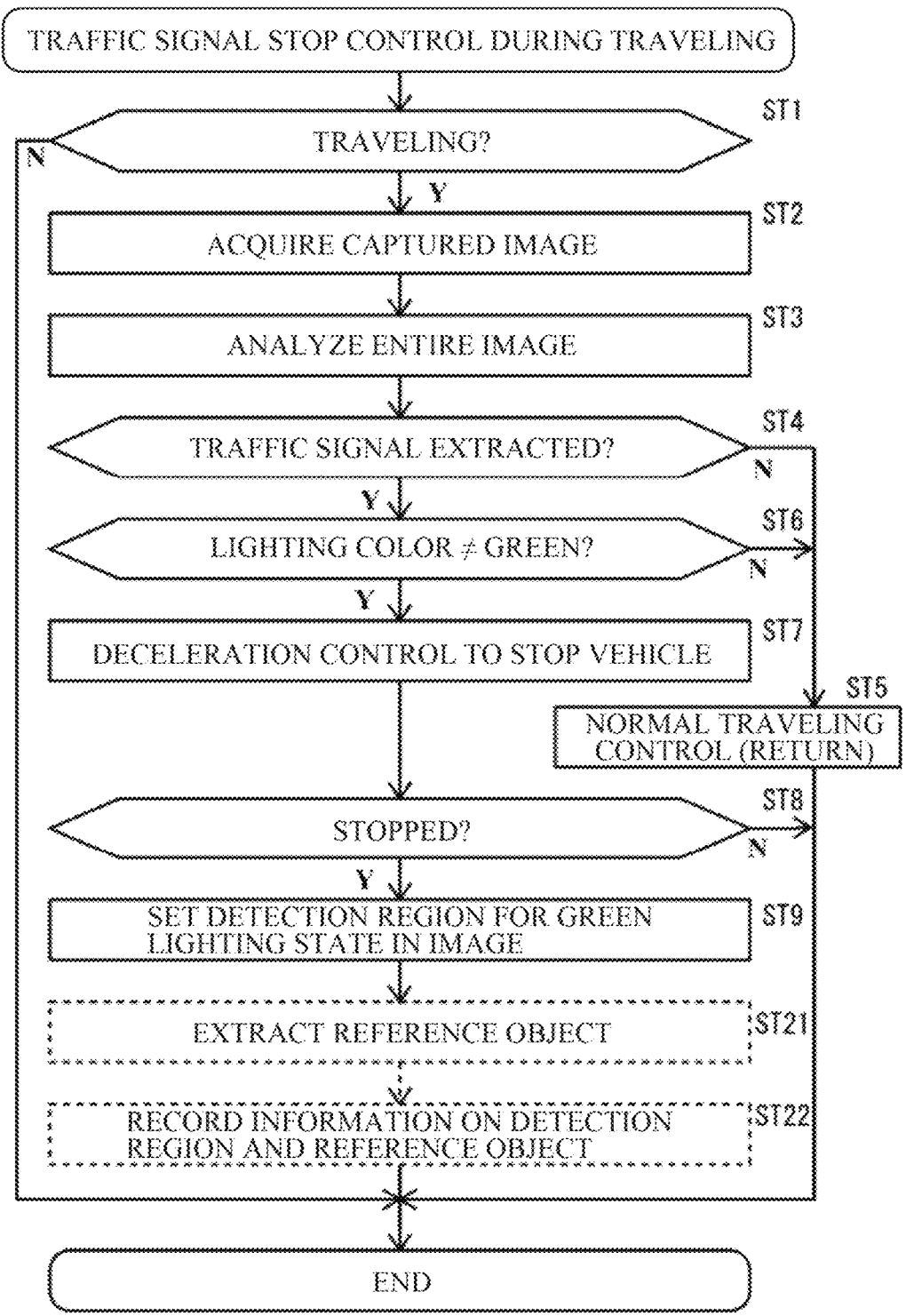
FIG. 4 is a flowchart illustrating a traffic signal stop control to be executed by a central processing unit (CPU) illustrated in FIG. 3 while the vehicle is traveling.

FIG. 4 is a flowchart illustrating the traffic signal stop control to be executed by the CPU 31 illustrated in FIG. 3 while the vehicle 1 is traveling.

In some example embodiments, the CPU 31 may repeatedly execute the traffic signal stop control illustrated in FIG. 4 while the vehicle 1 is traveling. The vehicle 1 may move in a period from a timing when an occupant gets in the vehicle 1 to a timing when the vehicle 1 is parked and the occupant gets off the vehicle 1. While moving, the vehicle 1 may repeat traveling and stopping. For example, in response to an operation performed on a start button of the vehicle 1, the CPU 31 may start the traffic signal stop control illustrated in FIG. 4, and may repeatedly execute the traffic signal stop control illustrated in FIG. 4 until the start button receives another operation.

Described first will be basic processes of stopping the vehicle 1 for the traffic signal, which are indicated by solid-line frames in FIG. 4.

In step ST1, the CPU 31 may determine whether the vehicle 1, which is the own vehicle, is traveling. For example, the CPU 31 may determine whether the vehicle 1 is traveling at a significant speed that is not zero, based on own vehicle information. Non-limiting examples of the own vehicle information may include a speed detected by the speed sensor and a temporal change in the captured image 20 obtained by the in-vehicle camera 36. For example, if the vehicle 1 is stopped and is not traveling (step ST1: N), the CPU 31 may end the traffic signal stop control. If the vehicle 1 is traveling at a significant speed that is not zero (step ST1: Y), the CPU 31 may cause the process to proceed to step ST2.

In step ST2, the CPU 31 may acquire the latest captured image 20 obtained by the in-vehicle camera 36.

In step ST3, the CPU 31 may analyze the acquired captured image 20. For example, the CPU 31 may analyze the entire captured image 20 that has been acquired, and may extract or identify a captured object. For example, when a captured object such as the traffic signal 11, the road sign 12, or the signboard illustrated in FIG. 1 is present within an imaging angle-of-view range of the in-vehicle camera 36, an image of the captured object may be included in the captured image 20. For example, the CPU 31 may use a result of pattern matching or machine learning regarding each of the captured object to extract or identify the captured object included in the captured image 20.

Note that when the captured object to be extracted or identified is limited to the traffic signal 11 or the road sign 12 in the air, for example, the CPU 31 may analyze a portion of the captured image 20 excluding a portion obviously corresponding to a road surface, rather than analyzing the entire captured image 20.

In step ST4, the CPU 31 may determine whether the traffic signal 11 is extracted as the captured object in relation to the road 10 or a traveling lane on which the vehicle 1 is traveling. If the traffic signal 11 is not extracted as the captured object included in the captured image 20 in step ST3, the CPU 31 may determine that the traffic signal 11 is not extracted. Moreover, for example, although the traffic signal 11 is extracted in step ST3, if the CPU 31 determines that the extracted traffic signal 11 is not the traffic signal 11 related to the road 10 or the traveling lane on which the vehicle 1 is traveling, based on an imaging direction of the traffic signal 11 or a position of the traffic signal 11 in the captured image 20, the CPU 31 may determine that the traffic signal 11 is not extracted. In these cases, i.e., if the traffic signal 11 is determined as not being extracted (step ST4: N), the CPU 31 may cause the process to proceed to step ST5. In contrast, if the traffic signal 11 related to the road 10 or the traveling lane on which the vehicle 1 is traveling (step ST4: Y), the CPU 31 may cause the process to proceed to step ST6.

In step ST5, the CPU 31 may continue a normal traveling control. Thereafter, the CPU 31 may end the traffic signal stop control.

In step ST6, the CPU 31 may analyze an image portion corresponding to the traffic signal 11 in the captured image 20, and may determine whether a lighting color of the traffic signal 11 is other than green. Unless in a situation such as blackout, the traffic signal 11 may be in any of the red lighting state, the green lighting state, and the yellow lighting state. Note that some traffic signals 11 may flash at a high speed in a lighting period. When a cycle of such flashing of the traffic signal 11 and a cycle of imaging performed by the in-vehicle camera 36 do not match each other, the traffic signal 11 included in the captured image 20 obtained by the in-vehicle camera 36 may not be in any of the red lighting state, the green lighting state, and the yellow lighting state. By determining whether the lighting color of the traffic signal 11 is other than green, the CPU 31 may determine that the lighting color of the traffic signal 11 is other than green when the traffic signal 11 is in the red lighting state or the yellow lighting state and when the lighting color of the traffic signal 11 is unidentifiable in the captured image 20 (step ST6: Y), and may thereafter cause the process to proceed to step ST7. If the CPU 31 does not determine that the lighting color of the traffic signal 11 in the captured image 20 is other than green, in other words, if the lighting color of the traffic signal 11 in the captured image 20 is green (step ST6: N), the CPU 31 may cause the process to proceed to step ST5. In this case, the CPU 31 may continue the normal traveling control. Note that if a deceleration control in step ST7 has been already started based on the traffic signal stop control in a previous cycle, for example, the CPU 31 may execute a control of returning to the normal traveling control from the already started deceleration control. The deceleration control in step ST7 will be described later.

In step ST7, the CPU 31 may halt the normal traveling control and execute the deceleration control to allow the vehicle 1 to stop at the stop line 13 before the traffic signal 11, and may thus stop the vehicle 1 before the stop line 13. Note that when the deceleration control has already been started by the traffic signal stop control in any of the previous cycles, the CPU 31 may continue the already started deceleration control. In the continued deceleration control, the CPU 31 may start the deceleration control based on extraction of a yellow lighting portion 42 of the traffic signal 11, and if a change of the traffic signal 11 to the red lighting state is detected, for example, the CPU 31 may execute a control of increasing a deceleration rate to reliably stop the vehicle 1 before the stop line 13.

In step ST8, the CPU 31 may determine whether the vehicle 1 is stopped. As a result of the deceleration control, the vehicle 1 may stop at the stop line 13 before the traffic signal 11. For example, when the speed detected by the speed sensor is zero or when there is no change among captured images obtained by the in-vehicle camera 36 at time intervals, the CPU 31 may determine that the vehicle 1 is stopped. If the CPU 31 determines that the vehicle 1 is stopped (step ST8: Y), the CPU 31 may cause the process to proceed to step ST9. Otherwise (step ST8: N), the CPU 31 may end the traffic signal stop control.

In step ST9, the CPU 31 may set a detection region 50 in the acquired captured image 20 obtained by the in-vehicle camera 36 while the vehicle 1 is stopped. The detection region 50 may be adapted to a detection of the green lighting state of the traffic signal 11. Typically, the traffic signal 11 may have an elongated outer shape in which a red lighting portion 43, the yellow lighting portion 42, and a green lighting portion 41 are arranged side by side in a lateral direction or a vertical direction. For example, the CPU 31 may set the detection region 50, which is adapted to the detection of the green lighting state, in a portion on the opposite side to the red lighting portion in an elongated range in which the traffic signal 11 is captured in the captured image 20 obtained when the vehicle 1 is stopped in accordance with the red lighting state of the traffic signal 11.

The basic processes of stopping the vehicle 1 for the traffic signal may be ended by setting the detection region 50 adapted to the detection of the green lighting state in step ST9.

Figure 5:
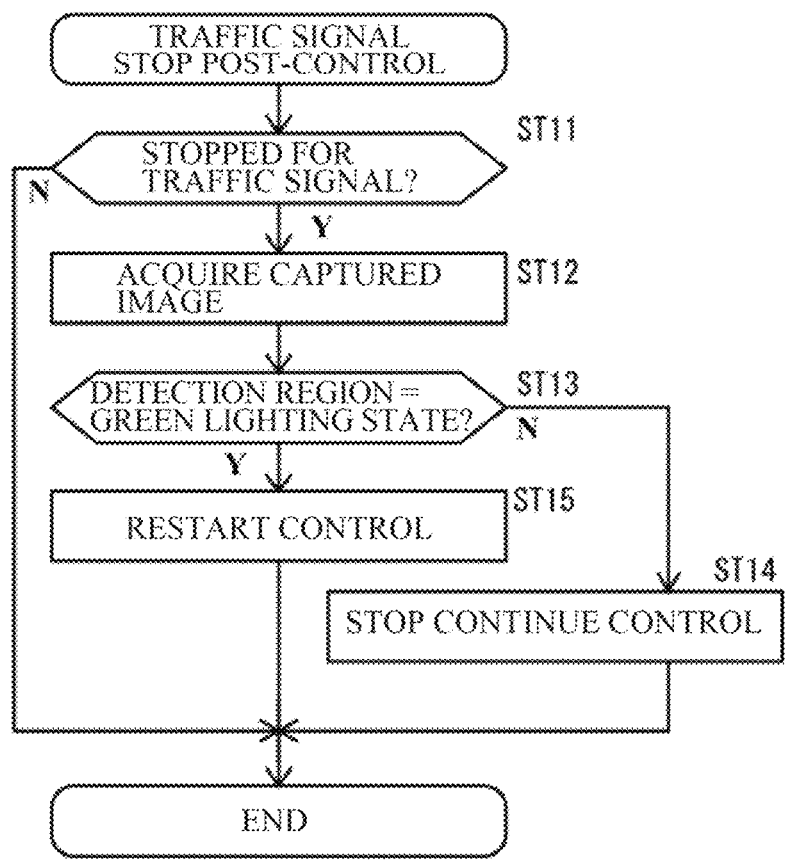
FIG. 5 is a flowchart illustrating a typical traffic signal stop post-control to be executed by the CPU illustrated in FIG. 3 after the vehicle stops for the traffic signal.

FIG. 5 is a flowchart illustrating a typical traffic signal stop post-control to be executed by the CPU 31 illustrated in FIG. 3 after the vehicle 1 stops for the traffic signal.

The CPU 31 may execute the traffic signal stop post-control illustrated in FIG. 5 when the CPU 31 executes the processes from step ST1 to step ST9 in the traffic signal stop control illustrated in FIG. 4.

For example, the CPU 31 may repeatedly execute the traffic signal stop post-control illustrated in FIG. 5 when the CPU 31 executes the process in step ST9 in the traffic signal stop control illustrated in FIG. 4 or while the vehicle 1 is traveling.

In step ST11, the CPU 31 may halt the normal traveling control of the vehicle 1 and may determine whether the vehicle 1 is stopped for the traffic signal 11. For example, the CPU 31 may determine whether the vehicle 1 is stopped by execution of the process in step ST7 illustrated in FIG. 4. If the vehicle 1 is not stopped for the traffic signal (step ST11: N), the CPU 31 may end the traffic signal stop post-control. If the vehicle 1 is stopped for the traffic signal (step ST11: Y), the CPU 31 may cause the process to proceed to step ST12.

In step ST12, the CPU 31 may acquire the latest captured image 20 obtained by the in-vehicle camera 36. The in-vehicle camera 36 may cyclically perform imaging also while the vehicle 1 is stopped for the traffic signal 11.

In step ST13, the CPU 31 may analyze the detection region 50 in the acquired latest captured image 20, and may determine whether the traffic signal 11, for which the vehicle 1 has stopped, is in the green lighting state. Basically, when the vehicle 1 is still stopped for the traffic signal 11, the imaging angle of view of the in-vehicle camera 36 may be the same as that in step ST9. When a predetermined period of time elapses, the traffic signal 11 may have changed from the red lighting state to the green lighting state. This may allow the CPU 31 to determine whether the traffic signal 11, for which the vehicle 1 has stopped, is in the green lighting state with use of the detection region 50 set in step ST9. If the traffic signal 11 has not changed to the green lighting state (step ST13: N), the CPU 31 may cause the process to proceed to step ST14. If the traffic signal 11 has changed to the green lighting state (step ST13: Y), the CPU 31 may cause the process to step ST15.

In step ST14, the CPU 31 may execute a control of maintaining a state in which the vehicle 1 is stopped for the traffic signal 11. The CPU 31 may continue the control of stopping the vehicle 1. Thereafter, the CPU 31 may end the traffic signal stop post-control.

In step ST15, the CPU 31 may execute a restart control of returning to the normal traveling control that has been halted. The CPU 31 may execute the restart control of starting the traveling of the vehicle 1 that has been stopped, and accelerating the vehicle 1. For example, the CPU 31 may thereafter return to the normal traveling control based on, for example, the process in step ST5. Note that in some example embodiments, the control of accelerating the vehicle 1 that has been stopped may be executed as a portion of the normal traveling control. In this case, the CPU 31 may set a flag indicating that the vehicle 1 is traveling. The flag may be used in the determination in step ST1. Thereafter, the CPU 31 may end the traffic signal stop post-control.

Next, a description will be provided of the traffic signal stop control and the restart control illustrated in FIGS. 4 and 5 based on examples of the lighting colors of the traffic signal 11.

Figure 6:
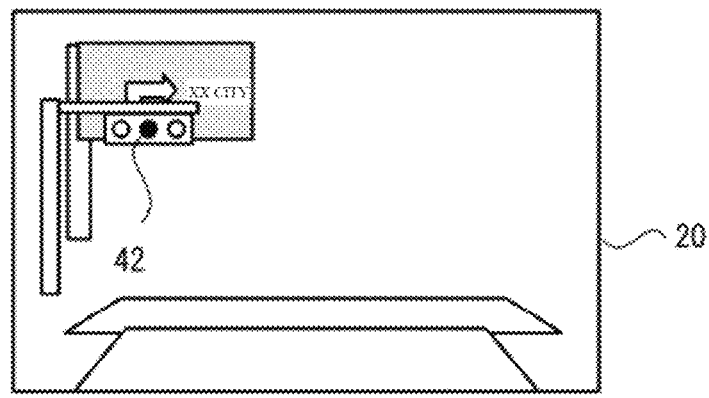
FIG. 6 is an explanatory diagram illustrating the captured image in a case where a traffic signal is in a yellow lighting state.

FIG. 6 is an explanatory diagram illustrating the captured image 20 in a case where the traffic signal 11 is in the yellow lighting state. The captured image 20 illustrated in FIG. 6 may include the yellow lighting portion 42 of the traffic signal 11. In this case, the CPU 31 may determine that the lighting color of the traffic signal 11 is other than green in step ST6, and may execute the deceleration control in step ST7. In addition, the CPU 31 may determine that the vehicle 1 is not stopped in step ST8. If the traffic signal 11 included in the captured image 20 is in the yellow lighting state, the CPU 31 may simply execute the deceleration control of the vehicle 1.

Figure 7:
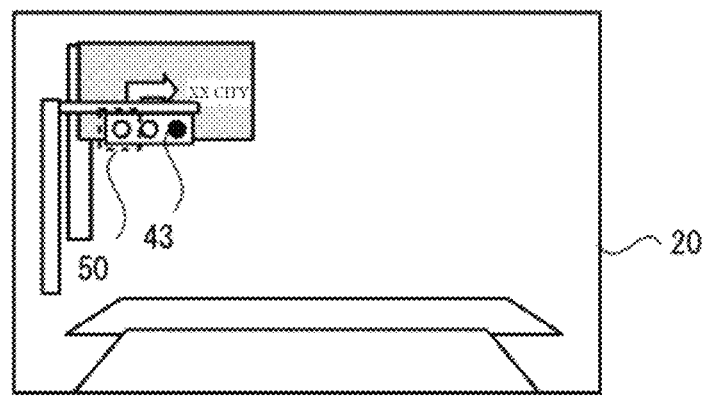
FIG. 7 is an explanatory diagram illustrating the captured image in a case where the traffic signal is in a red lighting state.

FIG. 7 is an explanatory diagram illustrating the captured image 20 in a case where the traffic signal 11 is in the red lighting state. The captured image 20 illustrated in FIG. 7 may include the red lighting portion 43 of the traffic signal 11. In this case, the CPU 31 may determine that the lighting color of the traffic signal 11 is other than green in step ST6, and may execute the deceleration control in step ST7. In addition, the CPU 31 may determine that the vehicle 1 is stopped in step ST8, and may set the detection region 50, which is adapted to the detection of the green lighting state, in the captured image 20 in step ST9. The traffic signal 11 illustrated in FIG. 7 may have a laterally elongated shape. In this case, for example, the CPU 31 may set the detection region 50, which is adapted to the detection of the green lighting portion 41, at a position on the left side of the red lighting portion 43 and beyond the yellow lighting portion 42 in the traffic signal 11.

In addition, after the vehicle 1 stops, the CPU 31 may determine that the vehicle 1 is stopped for the traffic signal in step ST11 of the traffic signal stop post-control illustrated in FIG. 5, and may determine whether the traffic signal 11 in the captured image 20 has changed to the green lighting state, with use of the set detection region 50. If the traffic signal 11 is still in the red lighting state, the CPU 31 may continue the control of stopping the vehicle 1.

Figure 8:
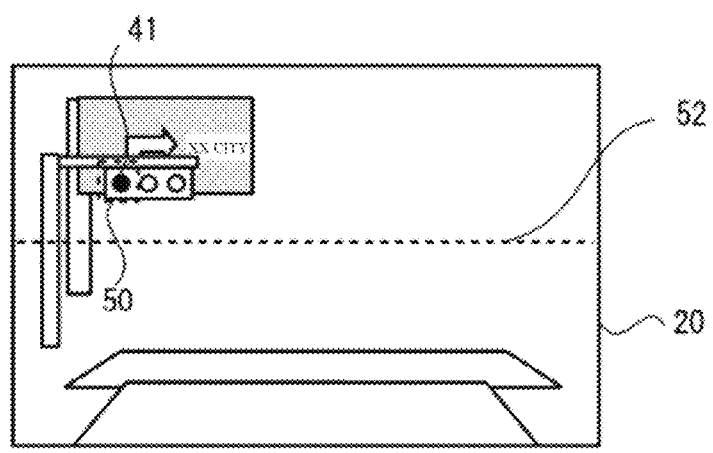
FIG. 8 is an explanatory diagram illustrating the captured image in a case where the traffic signal is in a green lighting state.

FIG. 8 is an explanatory diagram illustrating the captured image 20 in a case where the traffic signal 11 is in the green lighting state. The captured image 20 illustrated in FIG. 8 may include the green lighting portion 41 of the traffic signal 11. When the vehicle 1 is stopped for the traffic signal 11, the CPU 31 may determine that the traffic signal 11 is in the green lighting state in the detection region 50 in the latest captured image 20 in step ST13 illustrated in FIG. 5, and may execute the restart control in step ST15. The vehicle 1, which is the own vehicle, may restart and thereafter return to normal traveling. Further, the CPU 31 may determine that the vehicle 1 is traveling in step ST1 of the traffic signal stop control illustrated in FIG. 4 and executed while the vehicle 1 is traveling, and may start a determination regarding a next traffic signal 11 present in the traveling direction.

As described above, the traveling control apparatus 30 for the vehicle 1 may be configured to execute the traffic signal stop control to thereby stop the vehicle 1 for the traffic signal 11 and restart the vehicle 1 while the vehicle 1 is moving, based on the lighting color of the traffic signal 11 provided on the road 10.

However, in the traffic signal stop control described above, the image of the traffic signal 11 may be captured by the in-vehicle camera 36 provided in the vehicle 1, and the determination regarding the green lighting state may be performed based on the captured image 20 to control stopping and restarting of the traveling of the vehicle 1. This may not necessarily allow the vehicle 1 to travel under a favorable control.

For example, in the determination of the green lighting state of the traffic signal 11 based on the captured image 20 obtained by the in-vehicle camera 36, the green lighting state of the traffic signal 11 can be erroneously detected. If the green lighting state of the traffic signal 11 is erroneously detected, the CPU 31 can execute the control of restarting the vehicle 1. It may be difficult for the CPU 31 to execute a control of stopping the vehicle 1 again until the red lighting state or a non-green lighting state of the traffic signal 11 is detected again after the vehicle 1 is restarted. The vehicle 1 can continue traveling until the CPU 31 executes the control of stopping the vehicle 1 again.

Figure 9:
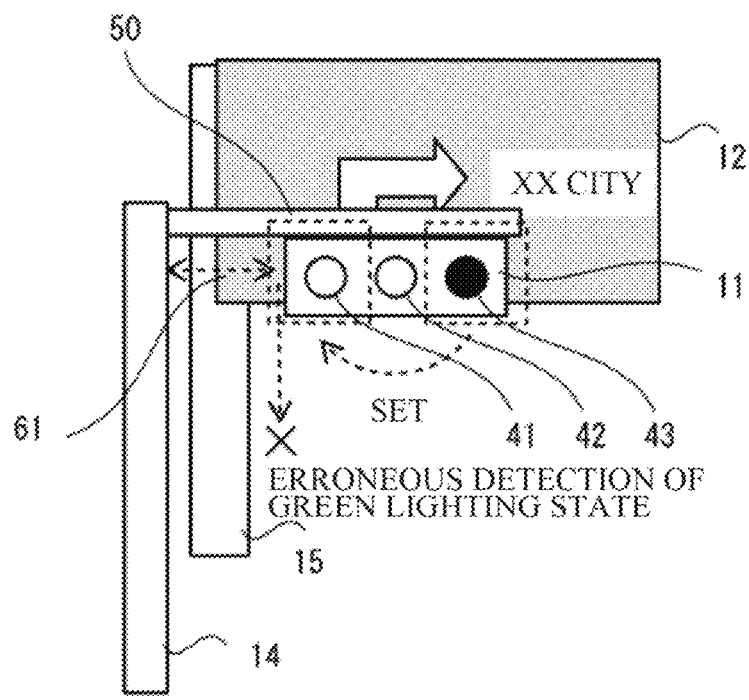
FIG. 9 is an explanatory diagram illustrating an example relationship between an imaging environment of the traffic signal having a laterally elongated shape illustrated in FIG. 1 and setting of a detection region.

FIG. 9 is an explanatory diagram illustrating an example relationship between an imaging environment of the traffic signal 11 having the laterally elongated shape illustrated in FIG. 1 and setting of the detection region 50.

In the captured image 20 illustrated in FIG. 9, the road sign 12 may be captured behind the traffic signal 11 in the red lighting state. The road sign 12 may be adapted to road guidance and may include a color of green. In some cases, an advertisement signboard including a color of green may be captured instead of the road sign 12 adapted to road guidance.

The CPU 31 may set the detection region 50, which is adapted to the detection of the green lighting state of the traffic signal 11, in the captured image 20 described above. The detection region 50 illustrated in FIG. 9 may be set to include a region around the image of the traffic signal 11 to reliably include the green lighting portion 41 of the traffic signal 11.

In the latest captured image 20 after the vehicle 1 is stopped for the traffic signal 11 in this case, the detection region 50 may include the road sign 12 or the signboard including the color of green, as in the example illustrated in FIG. 9. The CPU 31 can erroneously determine that the traffic signal 11 has changed to the green lighting state, based on that the color of green is included in the detection region 50 for the green lighting state of the traffic signal 11. When the detection region 50 set in the captured image 20 to detect the green lighting state of the traffic signal 11 as described above is greater than the size of the image of the traffic signal 11 in the captured image 20, the CPU 31 can erroneously detect the color of the image component in the background around the traffic signal 11 as the green lighting state of the traffic signal 11.

Moreover, such a method of setting the detection region 50 in the captured image 20 and determining the green lighting state of the traffic signal 11 may be based on the assumption that the vehicle 1 under the stop control does not move and the outside of the vehicle 1 to be subjected to the imaging by the in-vehicle camera 36 basically does not change. As described above, detecting the green lighting state of the traffic signal 11 based on the assumption that the traffic signal 11 is to be captured at a predetermined position in the captured image 20 may make it possible for the CPU 31 to detect the green lighting state by executing smaller-load processing in a shorter time rather than processing the entire captured image 20.

However, even if the traveling control apparatus 30 for the vehicle 1 executes the stop control, the vehicle 1 can move. For example, when a following vehicle comes into slight contact with the vehicle 1, the vehicle 1 can move forward in spite of the execution of the stop control. In addition, when the performance of the braking apparatus for the vehicle 1 is deteriorated, the vehicle 1 can slightly move in the traveling direction during the execution of the stop control. It may be difficult to eliminate the possibility of such disturbance or step-out.

Figure 10:
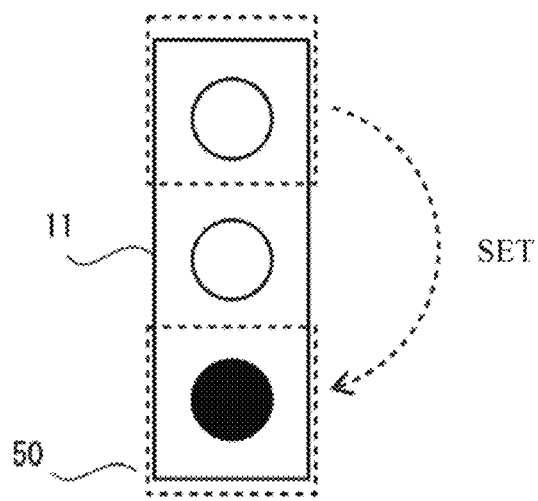
FIG. 10 is an explanatory diagram illustrating a setting example of the detection region for the traffic signal having a vertically elongated shape.

FIG. 10 is an explanatory diagram illustrating a setting example of the detection region 50 for the traffic signal 11 having a vertically elongated shape. For example, for the traffic signal 11 having the vertically elongated shape illustrated in FIG. 10, the CPU 31 may set the detection region 50 regarding the green lighting state on the lower side of the red lighting portion 43. In this case also, there can be an issue regarding the detection region 50, which may be similar to that in the case illustrated in FIG. 9.

Figure 11:
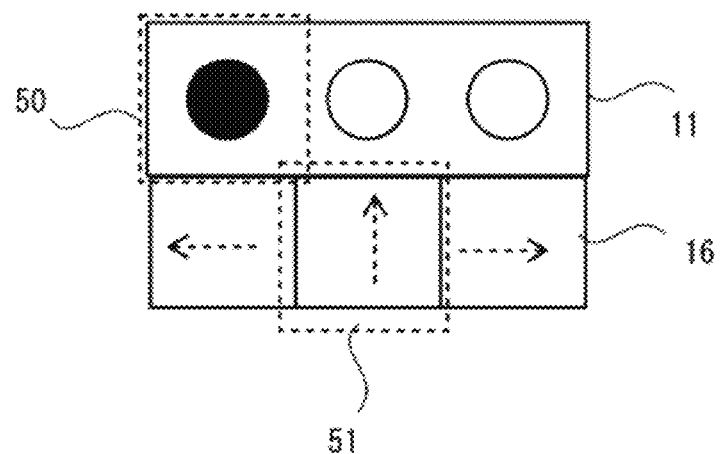
FIG. 11 is an explanatory diagram illustrating a setting example of a plurality of detection regions for the traffic signal including a direction indicator.

FIG. 11 is an explanatory diagram illustrating a setting example of a plurality of detection regions for the traffic signal 11 including a direction indicator 16.

The traffic signal 11 illustrated in FIG. 11 may be provided with the direction indicator 16 on the lower side. The direction indicator 16 may include a left-turn lighting part, a straight-traveling lighting part, and a right-turn lighting part. In this case, in some example embodiments, the CPU 31 may set the detection region 50 regarding the traffic signal 11 as a first detection region, and may further set a second detection region 51, different from the first detection region, for a lighting portion indicating the traveling direction of the vehicle 1. For example, the CPU 31 may set a plurality of detection regions including the first detection region (the detection region 50) for the green lighting state of the traffic signal 11 and the second detection region 51 for the direction indicator 16. The second detection region 51 for the direction indicator 16 can have an issue similar to that regarding the detection region 50 for the traffic signal 11.

As described above, it may be desirable that the traveling control apparatus 30 for the vehicle 1 be improved in terms of the traffic signal stop control using the detection region 50 adapted to the detection of the green lighting state of the traffic signal 11.

To address this, in the example embodiment, the detection region 50 set for, for example, the green lighting portion 41 of the traffic signal 11 may be set smaller than an actual imaging size of the traffic signal 11.

Figure 12:
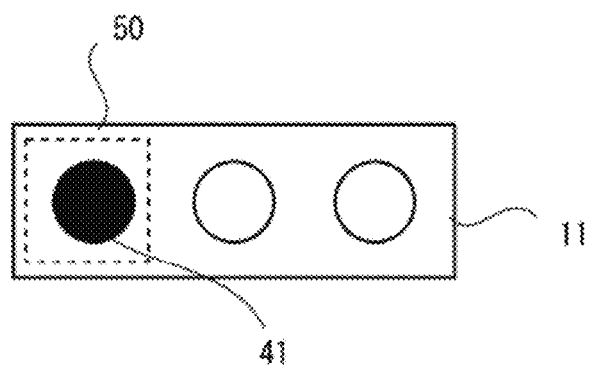
FIG. 12 is an explanatory diagram illustrating a setting example of the detection region to be set for a green lighting portion of the traffic signal in the captured image according to one example embodiment.

FIG. 12 is an explanatory diagram illustrating a setting example of the detection region 50 to be set for the green lighting portion 41 of the traffic signal 11 in the captured image 20 according to the example embodiment.

The detection region 50 illustrated in FIG. 12 may be set to allow the detection region 50 to be provided inside the outer shape of the traffic signal 11 and include substantially the entire green lighting portion 41 of the traffic signal 11. If the vehicle 1 stopped for the traffic signal 11 does not move, an image component of the background around the traffic signal 11 may be prevented from being included in the detection region 50 illustrated in FIG. 12.

The CPU 31 according to the example embodiment may set the detection region 50 illustrated in FIG. 12 in step ST9 described in FIG. 4.

In the example embodiment, the detection region 50 may thus be set to a range that is smaller than a portion capturing the traffic signal 11 in the captured image 20 obtained when the vehicle 1 is stopped and that includes the green lighting portion 41 of the traffic signal 11.

Further, in the example embodiment, the detection region 50 may be set for the green lighting portion 41 of the traffic signal 11 based on the captured image 20 obtained when the vehicle 1 is stopped for the traffic signal 11 and a captured reference object may be extracted. In addition, the detection region 50 whose position and range are adjusted based on the reference object may be used to adjust the detection region 50, which is adapted to the detection of the green lighting state of the traffic signal 11, in the captured image 20 obtained after the vehicle 1 is stopped for the traffic signal 11. An example of such an operation will be described below.

After performing the process in step ST9 in the traffic signal stop control illustrated in FIG. 4, the CPU 31 may cause the process to proceed to step ST21.

In step ST21, the CPU 31 may further extract the reference object from the captured image 20 obtained when the vehicle 1 is stopped for the traffic signal 11. The CPU 31 may extract the reference object together with the detection region 50 for the green lighting portion 41 of the traffic signal 11.

In step ST22, the CPU 31 may record information on the detection region 50 and the reference object in the memory 32. Thereafter, the CPU 31 may end the traffic signal stop control illustrated in FIG. 4.

The reference object may be any fixed object captured in the captured image 20. In some example embodiments, the reference object may be an object extending vertically in the captured image 20, such as the post 14, the post 15, or a utility pole. The captured image 20 illustrated in FIG. 2 may include the post 14 of the traffic signal 11 and the post 15 of the road sign 12. The CPU 31 may be configured to extract the object such as the post 14, the post 15, or the utility pole in the image analysis process in step ST3. In this case, for example, the CPU 31 may extract, as the reference object, one of the post 14, the post 15, and the utility pole that have been extracted in the image analysis process in step ST3.

In some example embodiments, the CPU 31 may also record, in the memory 32, information on a position and a range of the reference object in the captured image 20, together with the information regarding a position and a range of the detection region 50 in the captured image 20. The recorded pieces of information may serve as information indicating a relative positional relationship 61 between the detection region 50 and the reference object in the captured image 20 based on the captured image 20 used as a reference.

Note that in some example embodiments, the CPU 31 may record, in the memory 32, the position of the detection region 50 or the reference object in the captured image 20, for example, based on a position of an upper-left pixel of the detection region 50 or the reference object, using an upper-left pixel of the captured image 20 as the origin.

In some example embodiments, the CPU 31 may record, in the memory 32, the range of the detection region 50 or the reference object in the captured image 20, for example, based on a position of an upper-left pixel of the range and a position of a lower-right pixel of the range.

In this case, recorded in the memory 32 may be the respective positions of the upper-left and lower-right pixels of the detection region 50 in the captured image 20 using the upper-left pixel of the captured image 20 as the origin; and the respective positions of the upper-left and lower-right pixels of the reference object in the captured image 20 using the upper-left pixel of the captured image 20 as the origin.

Figure 13:
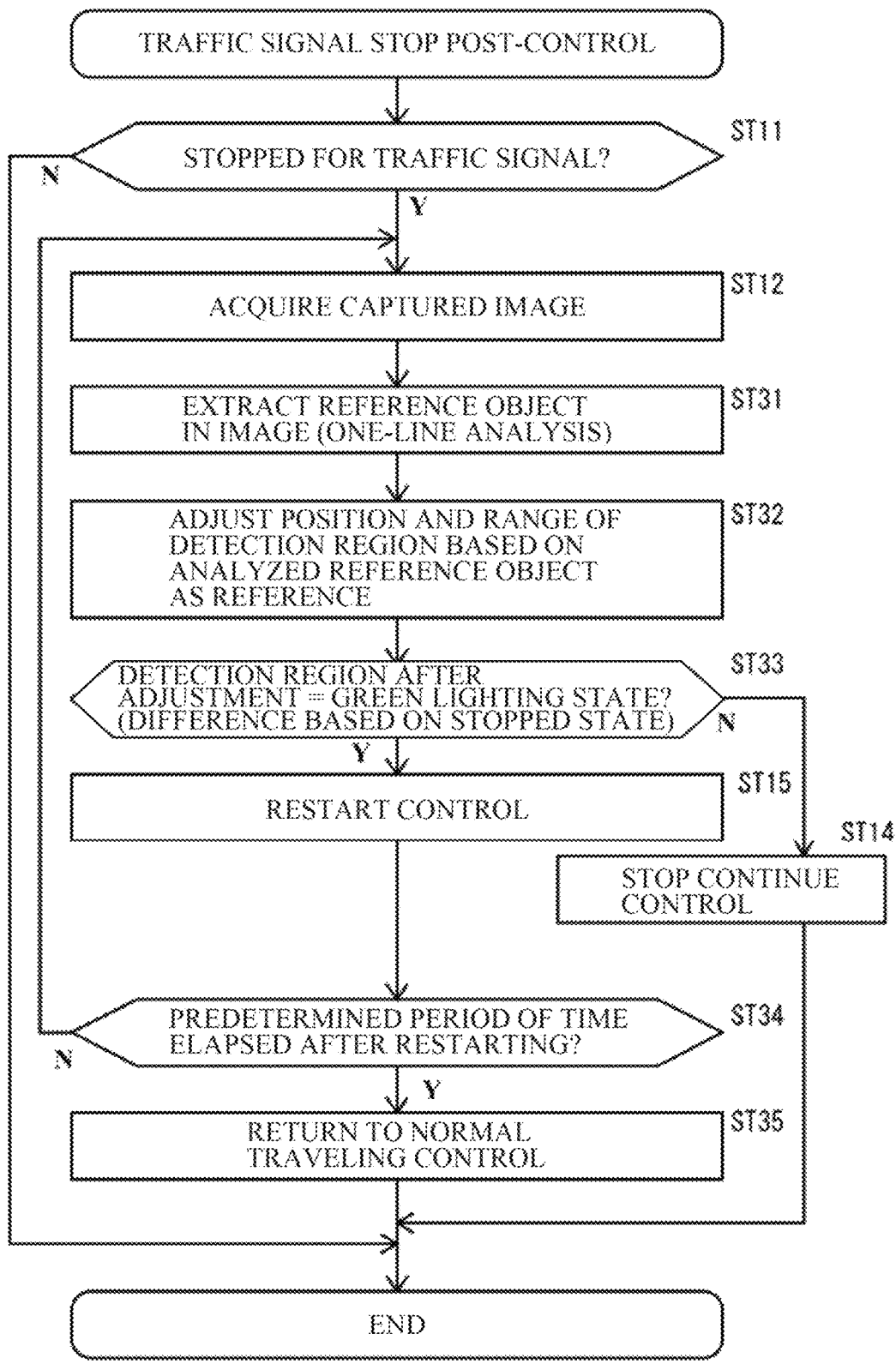
FIG. 13 is a flowchart illustrating a traffic signal stop post-control to be executed by the CPU illustrated in FIG. 3 after the vehicle stops for the traffic signal, according to one example embodiment.

In such a setting recorded state, the CPU 31 according to the example embodiment may execute a traffic signal stop post-control illustrated in FIG. 13 instead of the traffic signal stop post-control illustrated in FIG. 5.

FIG. 13 is a flowchart illustrating the traffic signal stop post-control to be executed by the CPU 31 illustrated in FIG. 3 after the vehicle 1 stops for the traffic signal 11, according to the example embodiment.

In FIG. 13, processes similar to those in FIG. 5 may be denoted by the same reference numerals and may not be described further. After acquiring the latest captured image 20 obtained by the in-vehicle camera 36 in step ST12, the CPU 31 may cause the process to proceed to step ST31.

In this case, the memory 32 may contain the information extracted from the captured image 20 obtained by the in-vehicle camera 36 in the vehicle 1 that is stopped based on the red lighting state of the traffic signal 11. For example, the memory 32 may contain information on the position and the range of the utility pole, the post 14, or the post 15 as the reference object in the captured image 20, together with the information on the position and the range of the detection region 50, which is adapted to the detection of the green lighting state, in the captured image 20. The contained pieces of information may be used as information indicating the relative positional relationship 61 between the detection region 50 and the reference object in the captured image 20. In some example embodiments, the memory 32 may also contain information on a characteristic to be used in identifying the reference object in the captured image 20, such as a color of the reference object.

In step ST31, the CPU 31 may analyze the latest captured image 20 acquired in step ST12, and may extract the position and the range, in the latest captured image 20, of the reference object recorded in the memory 32. In the example embodiment, the CPU 31 may select, as the reference object, the utility pole, the post 14, or the post 15 standing on the road 10. Such a standing reference object may extend along the vertical direction in the captured image 20. Therefore, in some example embodiments, instead of analyzing the entire latest captured image 20 acquired in step ST12 as in step ST3, the CPU 31 may analyze, for example, pixels 52 in one line in a lateral direction in the captured image 20 to extract a position and a range, in the latest captured image 20, of a pixel having the same characteristic as the standing reference object. This may make it possible for the CPU 31 to extract the position and the range of the standing reference object with a smaller processing load.

For example, when the vehicle 1 is approaching the standing reference object during the execution of the traffic signal stop control, a width of the standing reference object in the latest captured image 20 may increase, and the number of the pixels having the same characteristic as the standing reference object may also increase.

In addition, when the direction of the vehicle 1 changes during the execution of the traffic signal stop control, the position of the standing reference object in the latest captured image 20 may change, and the position of the pixel having the same characteristic as the standing reference object may also change.

Using the standing reference object as the reference object may make it possible to favorably extract respective changes in the position and the range of the standing reference object while reducing the processing load on the CPU 31.

In step ST32, the CPU 31 may adjust the position and the range of the detection region 50 recorded in the memory 32, using the information on the reference object obtained by the analysis in step ST31 as a reference.

For example, the CPU 31 may adjust the position and the range of the detection region 50 based on a difference between the position and the range of the reference object in the latest captured image 20 after setting of a detection range related to the present-cycle process; and the position and the range of the reference object in the captured image 20 obtained when the vehicle 1 is stopped for the traffic signal 11 and recorded in the memory 32.

For example, when the position of the reference object in the latest captured image 20 after the setting of the detection range has moved to the left side in the captured image 20, as compared with the position of the reference object in the captured image 20 obtained when the vehicle 1 is stopped for the traffic signal 11, the CPU 31 may move the position of the detection region 50 in the left direction by an amount of the movement of the reference object.

In contrast, for example, when the position of the reference object in the latest captured image 20 after the setting of the detection range has moved to the right side in the captured image 20, as compared with the position of the reference object in the captured image 20 obtained when the vehicle 1 is stopped for the traffic signal 11, the CPU 31 may move the position of the detection region 50 in the right direction by an amount of the movement of the reference object.

For example, when the width, which is based on the number of pixels, of the reference object in the latest captured image 20 after the setting of the detection range has increased, as compared with the width, which is based on the number of pixels, of the reference object in the captured image 20 obtained when the vehicle 1 is stopped for the traffic signal 11, the CPU 31 may expand the range of the detection region 50 in the upper-lower and the right-left directions at a rate of an increase in the width of the reference object.

In contrast, when the width, which is based on the number of pixels, of the reference object in the latest captured image 20 after the setting of the detection range has been reduced, as compared with the width, which is based on the number of pixels, of the reference object in the captured image 20 obtained when the vehicle 1 is stopped for the traffic signal 11, the CPU 31 may reduce the range of the detection region 50 in the upper-lower and the right-left directions at a rate of the decrease in the width of the reference object.

As described above, the CPU 31 may adjust the position and the range of the detection region 50 in the captured image 20 with use of the position and the range of the standing reference object in the captured image 20 after the setting of the detection range. The position and the range of the standing object in the captured image 20 after the setting of the detection range may have been obtained by simply analyzing the pixels 52 in one line in the lateral direction in the captured image 20 after the setting of the detection range. The standing reference object may be, for example, the utility pole, the post 14, or the post 15. The CPU 31 may move the detection region 50 in the lateral direction based on the difference in the position, in the lateral direction, of the standing reference object such as the utility pole, the post 14, or the post 15. Further, the CPU 31 may expand or reduce the detection region 50 based on the difference in the width of the standing reference object.

Note that, in some example embodiments, the CPU 31 may move the detection region 50, for example, in the vertical direction based on the difference in the width of the standing reference object.

Further, in some example embodiments, the CPU 31 may adjust one or both of the position and the range of the detection region 50. In this case, for example, the CPU 31 may adjust the position of the detection region 50 rather than the range of the detection region 50. This may make it possible for the green lighting portion 41 of the traffic signal 11 to be more easily included in the detection range.

Note that when the second detection region 51 is set for the direction indicator 16 as illustrated in FIG. 11, in some example embodiments, the CPU 31 may also adjust a position and a range of the second detection region 51 by executing processes similar to those regarding the first detection region (the detection region 50) described above.

In step ST33, the CPU 31 may determine whether the traffic signal 11 has changed to the green lighting state, based on the detection region 50 after the adjustment of the position and the range of the detection region 50 in step ST32 in the latest captured image 20 acquired in step ST12.

In the example embodiment, the detection region 50 may be set to the range that is smaller than a portion capturing the traffic signal 11 in the captured image 20 obtained when the vehicle 1 is stopped and that includes the green lighting portion 41 of the traffic signal 11. Accordingly, it may be highly possible that the detection region 50 after the adjustment simply includes the traffic signal 11. This may help to prevent the CPU 31 from erroneously determine that the traffic signal 11 has changed to the green lighting state, based on, for example, the green road sign 12 in the background around the traffic signal 11.

Further, in the example embodiment, the position and the range of the smaller detection region 50 described above may be adjusted in accordance with a change in the position and the range of the reference object. Accordingly, it may be highly possible that the detection region 50 after the adjustment reliably includes the green lighting portion 41 of the traffic signal 11. As a result, it may be possible for the CPU 31 to reliably determine whether the green lighting state is occurring in the green lighting portion 41 of the traffic signal 11 in the detection region 50 after the adjustment.

As described above, the CPU 31 may be prevented from easily erroneously determine that the traffic signal 11 has changed to the green lighting state in the determination regarding the green lighting state in the detection region 50. For example, even if the vehicle 1 moves during the execution of the stop control, the CPU 31 may be prevented from easily erroneously determine that the traffic signal 11 has changed to the green lighting state.

Further, when the traffic signal 11 is actually in the green lighting state, the CPU 31 may determine that the traffic signal 11 is in the green lighting state in the determination regarding the green lighting state in the detection region 50. If the CPU 31 determines that the traffic signal 11 is in the green lighting state in step ST33 (step ST33: Y), the CPU 31 may cause the process to proceed to step ST15. In step ST15, the CPU 31 may execute the restart control to return to the normal traveling control that has been halted. The restart control may be a control of restarting the vehicle 1. Thereafter, the CPU 31 may cause the process to proceed to step ST34.

In contrast, if the traffic signal 11 is not in the green lighting state, the CPU 31 may determine that the traffic signal 11 is not in the green light state in the determination regarding the green lighting state in the detection region 50. A case where the traffic signal 11 is not in the green light state may include a case where the lighting color of the traffic signal 11 is not included in the captured image 20. In this case (step ST33: N), the CPU 31 may cause the process to proceed to step ST14. In step ST14, the CPU 31 may execute the control of stopping the vehicle 1 and continue a state in which the vehicle 1 is stopped for the traffic signal 11. Thereafter, the CPU 31 may end the traffic signal stop post-control illustrated in FIG. 13.

Note that when the second detection region 51 is set for the direction indicator 16 as illustrated in FIG. 11, the CPU 31 may determine whether lighting is occurring in the second detection region 51 by processes similar to those regarding the first detection region (the detection region 50) described above.

In step ST34, the CPU 31 may determine whether a predetermined period of time has elapsed after the restarting of the vehicle 1. For example, the CPU 31 may cause the timer 33 to measure a period of time elapsing after the restarting of the vehicle 1 in the process in step ST15.

If the period of time measured by the timer 33 has not reached the predetermined period of time (step ST34: N), the CPU 31 may cause the process to return to step ST12. The CPU 31 may repeat the processes from step ST12 to step ST34 illustrated in FIG. 13. Further, when the period of time measured by the timer 33 reaches the predetermined period of time (step ST34: Y), the CPU 31 may cause the process to proceed to step ST35.

As described above, after beginning the restart control, the CPU 31 may repeat the processes from step ST12 to step ST34 illustrated in FIG. 13 until the predetermined period of time elapses. Further, if the CPU 31 determines that the traffic signal 11 is not in the green lighting state based on the determination regarding the detection region 50 while the CPU 31 repeats the processes, the CPU 31 may execute the process in step ST14 after the process in step ST33 to execute the control of stopping the vehicle 1, which has restarted, again. Accordingly, even if the CPU 31 erroneously determines that the traffic signal 11 is in the green lighting state, it may be possible for the CPU 31 to stop the vehicle 1, which is the own vehicle, again after the determination within a short period of time. If the CPU 31 is not able to determine such re-stopping after the restarting, the CPU 31 may not be able to execute a control adopted to decelerating and stopping the vehicle 1 until a sufficient period of time elapses after starting of the restart control and the CPU 31 determines that the traffic signal 11 is not in the green lighting state in step ST6 of the traffic signal stop control illustrated in FIG. 4 while the vehicle 1 is traveling. In addition, before executing the process in step ST6 in FIG. 4, the CPU 31 may be to execute the process of analyzing the entire latest captured image 20 in step ST3. It may be difficult for the CPU 31 to stop the traveling of the vehicle 1 before the vehicle 1 travels for a relatively long period of time after the restarting. In this case, it may be highly possible that an occupant such as a driver who drives the vehicle 1 feels as if the vehicle 1 is traveling unstably and gets worried. The example embodiment may help to prevent giving such an impression to the occupant such as the driver.

In contrast, if the period of time measured by the timer 33 reaches the predetermined period of time (step ST34: Y), the CPU 31 may cause the process to proceed to step ST35. In this case, in a period up to a timing when the period of time measured by the timer 33 reaches the predetermined period of time, the CPU 31 may continue determining that the traffic signal 11 is in the green lighting state in the detection region 50 after the adjustment. The possibility that the CPU 31 is erroneously determining that the traffic signal 11 is in the green lighting state may be very low:

In step ST35, the CPU 31 may execute a process of returning to the normal traveling control. Thereafter, the CPU 31 may end the traffic signal stop post-control illustrated in FIG. 13.

Based on the above-described control, it may be possible for the CPU 31 to increase reliability in restarting the vehicle 1 in accordance with the lighting color of the traffic signal 11. Even if the vehicle 1 stopped for the traffic signal 11 unexpectedly moves due to a cause such as disturbance or step-out while the vehicle 1 is stopped for the traffic signal 11, the CPU 31 may be prevented from easily restarting the vehicle 1 based on erroneous recognition of the green lighting state. Moreover, even if the vehicle 1 is restarted, it is possible for the CPU 31 to quickly stop the vehicle 1 again by reconfirming that the traffic signal 11 is not in the green lighting state thereafter. This may make it possible to reduce the amount and the period of the movement of the vehicle 1 before the vehicle 1 is stopped again.

Note that it may be very difficult to adjust the position and the range of the detection region 50 without using the change in the position and the range, in the captured image 20, of the reference object captured together with the traffic signal 11. In this case, rather than performing the process of determining the green lighting state simply in the detection region 50 that is a portion of the captured image 20, the CPU 31 may be to extract the traffic signal 11 through the analysis on the entire captured image 20 as in step ST3 in FIG. 4, and may be to further determine the lighting color of the traffic signal 11. The processing load on the CPU 31 in this case may be much greater than in a case where the processing is performed simply on the detection region 50. In addition, if the vehicle 1 that has been stopped for the traffic signal 11 moves, the CPU 31 may not be able to use the detection region 50 in the determination regarding the green lighting state. The CPU 31 may be to execute again the analysis of the entire captured image 20 as in step ST3 in FIG. 4 and extract the traffic signal 11, and to further determine the lighting color of the traffic signal 11. In the example embodiment, even if the vehicle 1 that has been stopped for the traffic signal 11 moves in such a manner, it may be possible to determine the green lighting state of the traffic signal 11 more easily in a shorter time.

In some example embodiments, the above-described predetermined period of time after starting of the restart control may be set long for safety: However, if the predetermined period time is too long, the vehicle 1 may move by a great amount. This can exclude the traffic signal 11, for which the vehicle 1 has stopped, from the imaging range of the in-vehicle camera 36. To address this, in some example embodiments, for example, the predetermined period of time may be set taking into consideration a flashing cycle of each lighting color of the traffic signal 11 and an imaging cycle of the in-vehicle camera 36, and may thereby be set to a period corresponding to the least common multiple of these cycles. When the predetermined period of time is set in this manner, one or more of the captured images 20 obtained within the predetermined period of time may include the lighting color of the traffic signal 11.

Figure 14:
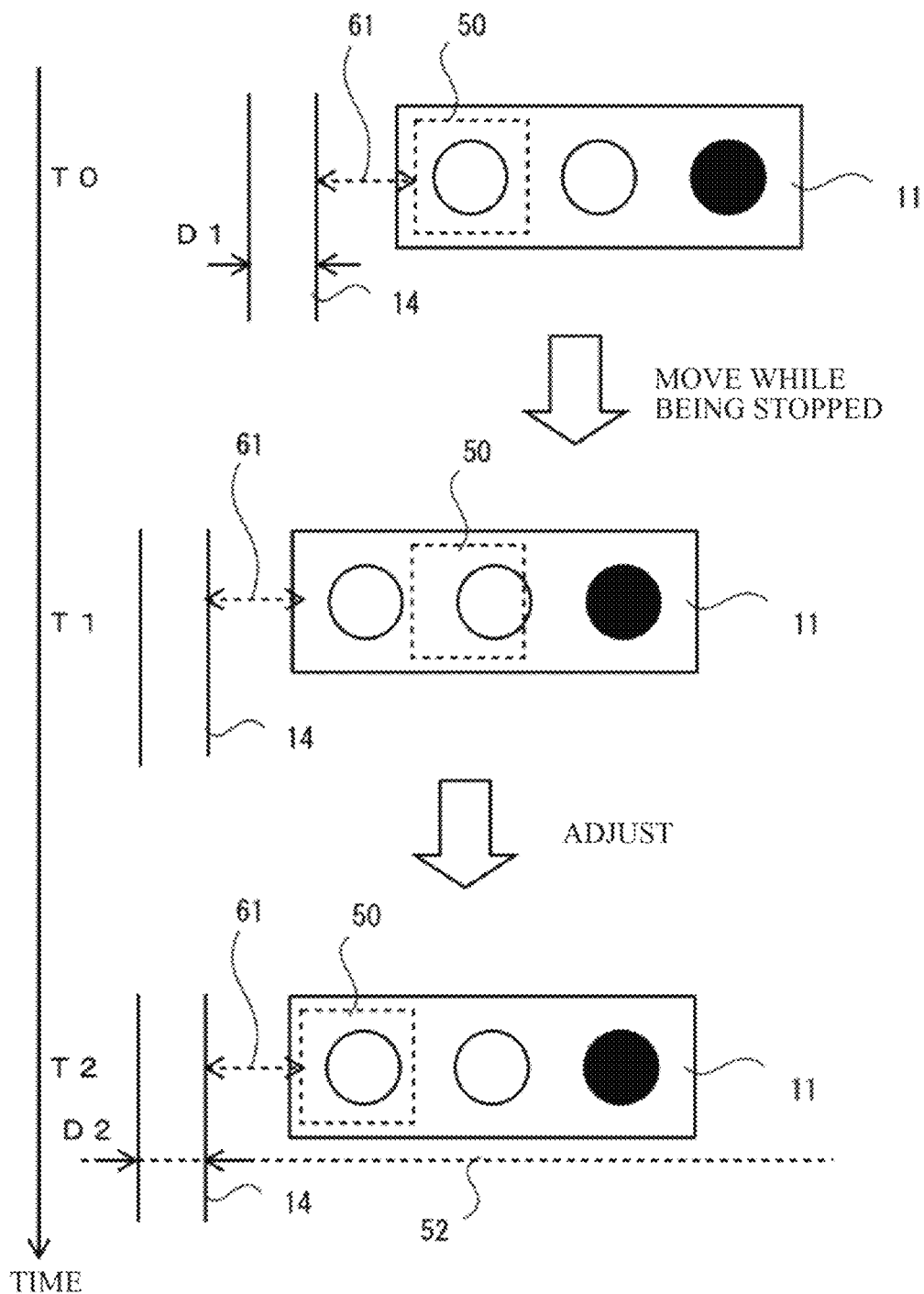
FIG. 14 is an explanatory diagram illustrating an example of a process of adjusting the detection region by the control illustrated in FIG. 13.

FIG. 14 is an explanatory diagram illustrating an example of a process of adjusting the detection region 50 by the control illustrated in FIG. 13.

FIG. 14 schematically illustrates respective positions of the traffic signal 11 and the post 14 thereof at each of timings corresponding to time T0, time T1, and time T2. Elapse of time may correspond to a direction from the top to the bottom of the paper plane. The right-left direction on the paper plane may schematically represent captured positions of the traffic signal 11 and the post 14 thereof in the captured image 20, i.e., the positions at which the traffic signal 11 and the post 14 thereof are captured in the captured image 20.

At time T0 in FIG. 14, the traffic signal 11 may be in the red lighting state. In this case, the CPU 31 may stop the vehicle 1. In addition, the CPU 31 may set the detection region 50, which is adapted to the detection of the green lighting state, based on the red lighting portion 43 of the traffic signal 11.

Thereafter, the CPU 31 may repeatedly perform and continue the traffic signal stop control until the CPU 31 determines that the traffic signal 11 has changed to the green lighting state. However, if the vehicle 1 under the traffic signal stop control moves, the captured position of the traffic signal 11 in the captured image 20 may shift. At time T1, the captured position of the traffic signal 11 may be shifted to the left side from the captured position at time T0. The captured position of the post 14 of the traffic signal 11 may also be shifted to the left side from the captured position at time T0, as with the traffic signal 11. As a result, the detection region 50 may be provided within the imaging range of the traffic signal 11 but may be provided outside the green lighting portion 41 of the traffic signal 11. Even if the CPU 31 attempts to determine the green lighting state in the detection region 50, it may be difficult for the CPU 31 to determine the green lighting state in the detection region 50.

To address this, the CPU 31 in the example embodiment may adjust the position and the range of the detection region 50 in the adjustment process in step ST32 in FIG. 13 performed on the captured image 20 at time T2. The CPU 31 may adjust the position and the range of the detection region 50 to maintain the relative positional relationship 61 between the traffic signal 11 and the post 14, using the position and the range, in the captured image 20, of the post 14 as the standing reference object captured together with the traffic signal 11 in the captured image 20. For example, as in the foregoing example, the CPU 31 may identify the position and the range of the width of the post 14 by the process of analyzing the pixels 52 corresponding to one line in the captured image 20 at time T2. Further, based on the assumption that the traffic signal 11 is shifted in a manner similar to a manner in which the post 14 is shifted, the CPU 31 may adjust the position and the range of the detection region 50. For example, in some example embodiments, the CPU 31 may shift the position of the detection region 50 based on a difference between the position of the post 14 in the captured image 20 at time T2 and the position of the post 14 in the captured image 20 at time T0. In some example embodiments, the CPU 31 may increase or reduce the size of the detection region 50 by an amount of an increase or a decrease in a width D2 of the post 14 relative to a width D1 of the post 14.

As illustrated in the drawing at time T2, the position and the range of the detection region 50 may thus be adjustable to allow the detection region 50 to be provided within the imaging range of the traffic signal 11 and to overlap with the green lighting portion 41 of the traffic signal 11. Determining the green lighting state of the traffic signal 11 with use of the detection region 50 after such an adjustment may make it possible for the CPU 31 to reliably determine whether the traffic signal 11 is in the green lighting state.

As described above, in the example embodiment, the detection region 50, which is adapted to the detection of the green lighting state of the traffic signal 11, in the captured image 20 after the setting of the detection range adapted to the determination of restarting may be adjusted based on the positional relationship 61 between the reference object and the traffic signal 11 in the captured image 20 after the setting of the detection range adapted to the determination of restarting. That is, in the example embodiment, as the detection region 50 to be used in the captured image 20 after the setting of the detection range adapted to the determination of restarting, the detection region 50 in the captured image 20 obtained when the vehicle 1 is stopped and used in setting the detection region 50, in the captured image 20, adapted to the detection of the green lighting state of the traffic signal 11, may not be used as it is.

As a result, for example, even if the vehicle 1 moves due to a cause other than the control performed by the CPU 31 serving as a controller after the vehicle 1 is stopped and the detection region 50 is extracted, it is possible to adjust the position and the range of the detection region 50 in relation to the traffic signal 11 in the captured image 20 obtained after the movement of the vehicle 1. This makes it possible for the CPU 31 to reliably detect that the traffic signal 11 is in the green lighting state. In addition, it is possible for the CPU 31 to restart the vehicle 1 based on the reliable detection of the green lighting state of the traffic signal 11.

In contrast, for example, if the detection region 50 in the captured image 20 obtained when the vehicle 1 is stopped is used in the captured image 20 after the setting of the detection range, when the vehicle 1 moves due to a cause other than the control performed by the CPU 31 after the vehicle 1 stops and the detection region 50 is extracted, the green lighting portion of the traffic signal 11 can be excluded from the detection range. In addition, for example, a green road sign 12 or a green signboard can be captured in an image portion in the detection range shifted from the traffic signal 11. In this case, the green road sign 12 or the green signboard can be erroneously detected as the green lighting state. In addition, for example, when the detection range is set greater than the traffic signal 11 in the captured image 20 or the green lighting portion 41 thereof to include the background of the traffic signal 11, even if the vehicle 1 does not move after being stopped, the green road sign 12 or the green signboard in the background of the traffic signal 11 can be erroneously detected as the green lighting state.

The example embodiment helps to prevent such an erroneous detection from occurring and makes it possible to reliably detect that the traffic signal 11 is in the green lighting state. This may allow the vehicle 1 to restart based on the green lighting state of the traffic signal 11 when the traffic signal 11 is in the green lighting state.

As described above, the example embodiment makes it possible to improve the traffic signal stop control using the detection region 50 adapted to the detection of the green lighting state of the traffic signal 11.

For example, in the example embodiment, the utility pole, the post 14, or the post 15 may be extracted as the reference object. The utility pole, the post 14, or the post 15 may be capturable in a standing state in the captured image 20 obtained when the vehicle 1 is stopped. In this case, the CPU 31 may be to record, in the memory 32, the information on the position and the range of the utility pole, the post 14, or the post 15 that is the standing reference object in the captured image 20 obtained when the vehicle 1 is stopped, and to extract the utility pole, the post 14, or the post 15 from the captured image 20 after the setting of the detection range. In this case, the CPU 31 may extract, as the reference object, the utility pole, the post 14, or the post 15 captured in a standing state in the captured image 20. Therefore, it may be enough to analyze the pixels 52 corresponding to one line in the lateral direction in the captured image 20 after the setting of the detection range. This may allow for obtainment of information to reliably adjust the position and the range of the detection region 50. For example, in some example embodiments, the CPU 31 may move the detection region 50 in the lateral direction based on a difference in the position of the utility pole, the post 14, or the post 15 in the lateral direction. For example, in some example embodiments, the CPU 31 may move the detection region 50 in the vertical direction or may expand or reduce the detection region 50 based on a difference in the width of the utility pole, the post 14, or the post 15 in the lateral direction. This may save the CPU 31 from analyzing the entire captured image 20 to extract the entire utility pole, the entire post 14, or the entire post 15 in the analysis process on the captured image 20 after the setting of the detection range. This makes it possible to reduce the time in which the CPU 31 executes the adjustment process on the detection region 50 based on the captured image 20 after the setting of the detection range.

In the example embodiment, also after detecting the green lighting state of the traffic signal 11 and starting the control of restarting the vehicle 1, the CPU 31 may adjust the position and the range of the detection region 50 and determine the green lighting state of the traffic signal 11 based on the captured image 20 obtained by the in-vehicle camera 36. When the CPU 31 determines that the traffic signal 11 is not in the green lighting state after starting the control of restarting the vehicle 1, the CPU 31 may stop the vehicle 1 again after execution of the control of restarting the vehicle 1. It may be thus possible for the CPU 31 to, even after erroneously determine the green lighting state and restarting the vehicle 1, confirm that the traffic signal 11 is in fact not in the green lighting state and stop the vehicle 1 again that has been restarted.

Further, in the example embodiment, the detection region 50 may be set to a range that is smaller than a portion capturing the traffic signal 11 in the captured image 20 obtained when the vehicle 1 is stopped, and in which the green lighting portion 41 of the traffic signal 11 is included. This may help to prevent the background around the traffic signal 11 from being included in the detection range.

In addition, in the example embodiment, although the detection region 50 may be set small, the position and the range of the small detection region 50 may be adjusted for each captured image 20 based on a portion capturing the reference object capturable together with the traffic signal 11. This helps to prevent the green lighting portion 41 of the traffic signal 11 from being excluded from the detection region 50 set in the captured image 20.

Second Example Embodiment

Next, a second example embodiment of the disclosure will be described. In the following, differences between the second example embodiment and the foregoing first example embodiment will be mainly described. Components similar to those in the foregoing first example embodiment will be denoted with the same reference numerals and will not be described further.

In the second example embodiment, the server 101 may control the traveling of the vehicle 1.

Figure 15:
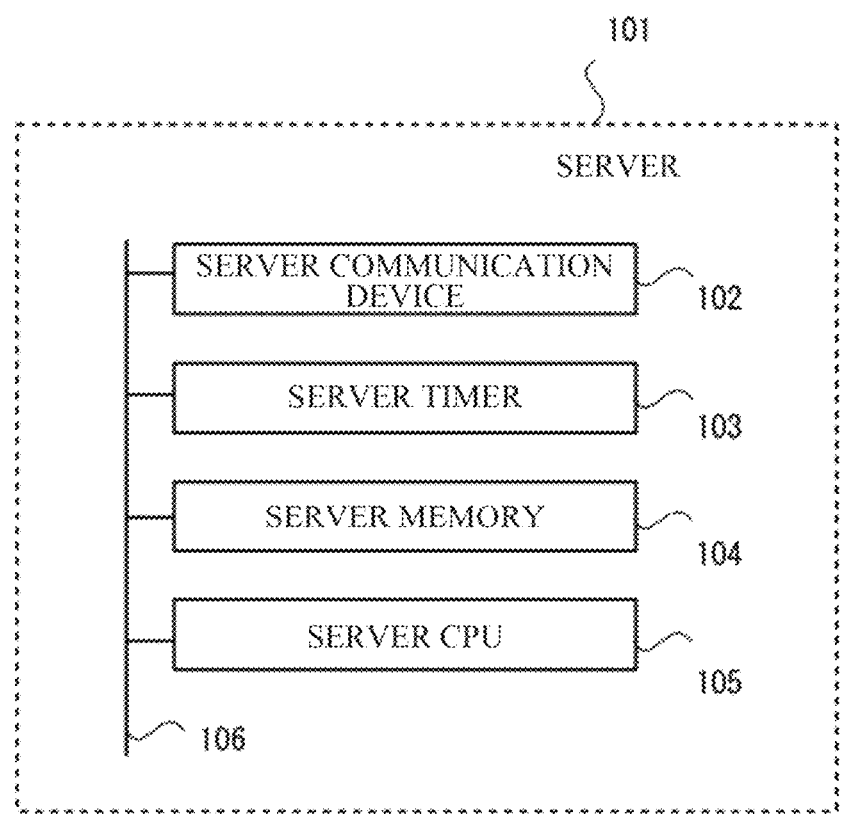
FIG. 15 is an explanatory diagram illustrating a server configured to control traveling of the vehicle, according to one example embodiment of the disclosure.

FIG. 15 is an explanatory diagram illustrating the server 101 configured to control the traveling of the vehicle 1, according to the second example embodiment of the disclosure.

The server 101 illustrated in FIG. 15 may include a server communication device 102, a server timer 103, a server memory 104, a server CPU 105, and a server bus 106. The server communication device 102, the server timer 103, the server memory 104, and the server CPU 105 may be coupled to the server bus 106.

The server communication device 102 may be coupled to a communication network such as the Internet. As illustrated in FIG. 3, the server communication device 102 may transmit and receive information to and from the vehicle outside communicator 37 of the vehicle 1 traveling on the road 10, for example, via the base station 100 coupled to the communication network.

The server timer 103 may measure a time or a period of time.

The server memory 104 may record a program to be executed by the server CPU 105 and data. The server memory 104 may include, for example, a non-volatile semiconductor memory, an HDD, or a RAM.

The server CPU 105 may read the program recorded in the server memory 104 and execute the program. This may implement a server controller. The server CPU 105 serving as the server controller may manage an operation of the server 101. The server controller may serve as the traveling control apparatus 30 for the vehicle 1 that remotely controls or assists the traveling of the vehicle 1. In this case, the server CPU 105 may use the server communication device 102 to acquire, from the vehicle 1, information on a movement of the vehicle 1 and may transmit, to the vehicle 1, information usable for the CPU 31 of the traveling control apparatus 30 in execution of the traveling control of the vehicle 1.

In order to control or manage the traveling of the vehicle 1, the server CPU 105 serving as the traveling control apparatus 30 may be configured to execute the traffic signal stop control during traveling illustrated in FIG. 4 and the traffic signal stop post-control illustrated in FIG. 13 with use of the information acquired from the vehicle 1. In this case, the CPU 31 of the traveling control apparatus 30 for the vehicle 1 may stop the vehicle 1 at the stop line 13 before the traffic signal 11 or restart the vehicle 1 after stopping the vehicle 1, under the control performed by the server CPU 105 of the server 101.

Note that in some example embodiments, the server CPU 105 of the server 101 and the CPU 31 of the traveling control apparatus 30 for the vehicle 1 may cooperate to execute the traffic signal stop control during traveling illustrated in FIG. 4 and the traffic signal stop post-control illustrated in FIG. 13.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

As described above, in one example embodiment, a detection region, which is adapted to a detection of a green lighting state of a traffic signal, in a captured image after setting of a detection range adapted to a determination of restarting may be adjusted based on a positional relationship between a reference object and the traffic signal in the captured image after the setting of the detection range adapted to the determination of restarting. That is, in the example embodiment, as the detection region to be used in the captured image after the setting of the detection range adapted to the determination of restarting, the detection region in the captured image obtained when a vehicle is stopped and used in setting the detection region, in the captured image, adapted to the detection of the green lighting state of the traffic signal, may not be used as it is.

As a result, for example, even if the vehicle moves due to a cause other than a control performed by a processor after the vehicle is stopped and the detection region is extracted, it is possible to adjust the detection region in relation to the traffic signal in the captured image obtained after the movement of the vehicle. This makes it possible for the processor to reliably detect that the traffic signal is in the green lighting state. In addition, it is possible for the processor to restart the vehicle based on the reliable detection of the green lighting state of the traffic signal.

In contrast, for example, if the detection region in the captured image obtained when the vehicle is stopped is used in the captured image after the setting of the detection range, when the vehicle moves due to a cause other than the control performed by the processor after the vehicle stops and the detection region is extracted, the green lighting portion of the traffic signal can be excluded from the detection range. In addition, for example, a green road sign or a green signboard can be captured in an image portion in the detection range shifted from the traffic signal. In this case, the green road sign or the green signboard can be erroneously detected as the green lighting state. In addition, for example, when the detection range is set greater than the traffic signal in the captured image or the green lighting portion thereof to include the background of the traffic signal, even if the vehicle does not move after being stopped, the green road sign or the green signboard in the background of the traffic signal can be erroneously detected as the green lighting state.

The example embodiment helps to prevent such an erroneous detection from occurring and makes it possible to reliably detect that the traffic signal is in the green lighting state. This may allow the vehicle to restart based on the green lighting state of the traffic signal when the traffic signal is in the green lighting state.

As described above, the example embodiment makes it possible to improve a traffic signal stop control using the detection region adapted to the detection of the green lighting state of the traffic signal.

Each of the CPU 31 illustrated in FIG. 3 and the server CPU 105 illustrated in FIG. 15 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 31 illustrated in FIG. 3 and the server CPU 105 illustrated in FIG. 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the CPU 31 illustrated in FIG. 3 and the server CPU 105 illustrated in FIG. 15.

The invention claimed is:

1. A vehicle traveling control apparatus comprising:
   an in-vehicle camera provided in a vehicle and configured to capture an image of a traffic signal outside the vehicle;
   a processor configured to execute a traffic signal stop control of analyzing the captured image and stopping the vehicle before the traffic signal when the traffic signal is in a red light state; and
   a memory configured to be used by the processor, wherein the processor is further configured to:
      set a detection region in the captured image, extract information on a reference object in the captured image, and record the information in the memory, the detection region being adapted to a detection of a green light state of the traffic signal in the captured image, the captured image being obtained by the in-vehicle camera in the vehicle when the vehicle is stopped;
      determine the green light state of the traffic signal in the detection region based on the captured image obtained by the in-vehicle camera after setting of the detection range;
      restart the vehicle in response to determining the green light state; and
      perform an adjustment of the detection region based on a difference between the reference object in the captured image after the setting of the detection range and the reference object in the captured image obtained when the vehicle is stopped and recorded in the memory.

2. The vehicle traveling control apparatus according to claim 1, wherein the processor is further configured to;
   extract a standing reference object as the reference object from the captured image obtained when the vehicle is stopped, and record, in the memory, information on a position and a range of the standing reference object in the captured image obtained when the vehicle is stopped, the standing reference object being capturable in a standing state in the captured image obtained when the vehicle is stopped;
   identify the position and the range of the standing reference object in the captured image after the setting of the detection range, by analyzing the captured image after the setting of the detection range at one line in a lateral direction;
   execute the adjustment of the detection region comprising at least a first adjustment of the first adjustment and a second adjustment, the first adjustment being an adjustment in which a position of the detection region is moved in the lateral direction based on a difference in the position of the standing reference object in the lateral direction, the second adjustment being an adjustment in which a range of the detection region is expanded or reduced based on a difference in a width of the standing reference object in the lateral direction; and
   determine the green light state of the traffic signal based on the captured image obtained by the in-vehicle camera, with use of the detection region after the adjustment.

3. The vehicle traveling control apparatus according to claim 1, wherein the processor is further configured to;
   after detecting the green light state of the traffic signal and starting a control of restarting the vehicle, adjust one or both of a position and a range of the detection region and determine the green light state of the traffic signal based on the captured image obtained by the in-vehicle camera; and
   when determining that the traffic signal is not in the green light state in the detection region after starting the control of restarting the vehicle, stop the vehicle again.

4. The vehicle traveling control apparatus according to claim 2, wherein the processor is further configured to;
   after detecting the green light state of the traffic signal and starting a control of restarting the vehicle, adjust one or both of a position and a range of the detection region and determine the green light state of the traffic signal based on the captured image obtained by the in-vehicle camera; and
   when determining that the traffic signal is not in the green light state in the detection region after starting the control of restarting the vehicle, stop the vehicle again.

5. The vehicle traveling control apparatus according to claim 3, wherein the processor is further configured to set the detection range to a range that is smaller than a portion capturing the traffic signal in the captured image obtained when the vehicle is stopped, and in which a green light portion of the traffic signal is includable.

6. The vehicle traveling control apparatus according to claim 4, wherein the processor is further configured to set the detection range to a range that is smaller than a portion capturing the traffic signal in the captured image obtained when the vehicle is stopped, and in which a green light portion of the traffic signal is includable.

7. The vehicle traveling control apparatus according to claim 5, wherein the processor is further configured to:
   determine whether the traffic signal is in the green light state in the detection region after the adjustment in the captured image after the setting of the detection range;
   when the traffic signal is in the green light state, execute the control of restarting the vehicle; and
   when the traffic signal is not in the green light state, execute a control of stopping the vehicle.

8. The vehicle traveling control apparatus according to claim 6, wherein
   the processor is further configured to:
      determine whether the traffic signal is in the green light state in the detection region after the adjustment in the captured image after the setting of the detection range;
      when the traffic signal is in the green light state, execute the control of restarting the vehicle; and
      when the traffic signal is not in the green light state, execute a control of stopping the vehicle.

* * * * *